United States Patent
Young

(10) Patent No.: US 9,066,626 B2
(45) Date of Patent: Jun. 30, 2015

(54) CUTTING BOARD APPARATUS WITH COLLAPSIBLE TRAY

(71) Applicant: Keith Young, Wantagh, NY (US)

(72) Inventor: Keith Young, Wantagh, NY (US)

( * ) Notice: Subject to any disclaimer, the term of this patent is extended or adjusted under 35 U.S.C. 154(b) by 0 days.

(21) Appl. No.: 13/761,808

(22) Filed: Feb. 7, 2013

(65) Prior Publication Data

US 2013/0214466 A1 Aug. 22, 2013

Related U.S. Application Data

(60) Provisional application No. 61/595,905, filed on Feb. 7, 2012.

(51) Int. Cl.
 *B25B 1/00* (2006.01)
 *A47J 47/00* (2006.01)

(52) U.S. Cl.
 CPC ...................................... *A47J 47/005* (2013.01)

(58) Field of Classification Search
 CPC ....................................................... A47J 47/005
 USPC ............................ 269/289 R, 302.1, 303, 308
 See application file for complete search history.

(56) References Cited

U.S. PATENT DOCUMENTS

| | | |
|---|---|---|
| 4,907,789 A | 3/1990 | Tice |
| 5,031,975 A | 7/1991 | Anderson |
| 5,044,059 A | 9/1991 | DeGiulio |
| 5,121,909 A | 6/1992 | Stickel, III |
| 5,312,178 A | 5/1994 | King |
| 5,520,324 A | 5/1996 | Cai |
| 5,673,905 A | 10/1997 | Kiene |
| 5,832,804 A | 11/1998 | Dudley et al. |
| 5,865,105 A | 2/1999 | Pepelanov |
| 5,938,185 A | 8/1999 | Kletter |
| 5,984,294 A | 11/1999 | Bogomolny |
| 5,992,035 A | 11/1999 | Otsu |
| 5,996,983 A * | 12/1999 | Laurenzi ........................ 269/15 |
| 6,026,972 A | 2/2000 | Makowski |
| 6,341,770 B1 | 1/2002 | Landherr |
| 6,460,841 B1 | 10/2002 | Durr |
| 6,726,050 B1 | 4/2004 | Barentine et al. |
| 6,745,702 B2 | 6/2004 | Goldberg et al. |
| 6,866,035 B2 | 3/2005 | Haemerle |
| 6,994,335 B2 | 2/2006 | Porchia et al. |
| 7,178,798 B1 | 2/2007 | Funk et al. |
| 7,191,712 B2 | 3/2007 | Goldberg et al. |
| 7,208,216 B2 | 4/2007 | Ackerman et al. |
| 7,213,806 B2 | 5/2007 | Mitchell |
| 7,252,255 B2 | 8/2007 | Cornfield |
| 7,942,395 B2 | 5/2011 | Okada |
| 8,251,357 B2 | 8/2012 | Young |
| 2002/0185801 A1 * | 12/2002 | Cautereels et al. ....... 269/289 R |
| 2004/0119220 A1 | 6/2004 | Davis |
| 2005/0040580 A1 | 2/2005 | Davis |

(Continued)

*Primary Examiner* — Lee D Wilson
*Assistant Examiner* — Nirvana Deonauth
(74) *Attorney, Agent, or Firm* — Carter, DeLuca, Farrell & Schmidt, LLP

(57) ABSTRACT

An apparatus for treating food substances, includes a cutting plate defining a longitudinal axis and having at least one cutting surface for supporting food substances and a collecting tray mounted with respect to the cutting plate. The collecting tray is dimensioned and adapted to transition between a first stored condition to facilitate storage or transport thereof and a second operative condition to provide a reservoir for collecting food substances cut on the cutting surface.

13 Claims, 10 Drawing Sheets

(56) References Cited

U.S. PATENT DOCUMENTS

| | | |
|---|---|---|
| 2008/0084019 A1 | 4/2008 | Casale et al. |
| 2008/0134945 A1 | 6/2008 | Willey |
| 2008/0149552 A1* | 6/2008 | Murphy ........................ 210/251 |
| 2008/0179803 A1 | 7/2008 | Shew et al. |
| 2008/0179805 A1 | 7/2008 | Shew et al. |
| 2009/0322004 A1* | 12/2009 | Young .............................. 269/15 |
| 2011/0221112 A1* | 9/2011 | Kent ................................ 269/15 |
| 2012/0319339 A1 | 12/2012 | Young |

* cited by examiner

CUTTING BOARD APPARATUS WITH COLLAPSIBLE TRAY

CROSS-REFERENCE TO RELATED APPLICATIONS

This application claims priority to, and the benefit of, U.S. Provisional Application Ser. No. 61/595,905, filed on Feb. 7, 2012 to Young, the entire contents of which are being incorporated by reference herein.

BACKGROUND

The present disclosure relates to an apparatus for treating food particles, and, in particular, relates to a cutting board apparatus incorporating features for facilitating removal of the food particles from the cutting board area and subsequent capturing for disposal.

Cutting boards are known in the art, and, typically, incorporate a cutting surface which may be planar or incorporate indentations to collect fluid released during the cutting process such as the juices released during the cutting of meat.

SUMMARY

The present disclosure relates to an apparatus for treating food substances including a cutting plate defining a longitudinal axis and having at least one cutting surface for supporting food substances and a collecting tray mounted with respect to the cutting plate. The collecting tray is dimensioned and adapted to transition between a first stored condition to facilitate storage or transport thereof and a second operative condition to provide a reservoir for collecting food substances cut on the cutting surface. The collecting tray is arranged about a vertical axis corresponding generally to a height of the collecting tray. The collecting tray is dimensioned to transition between the first stored condition defining a first height and the second operative condition defining a second height greater than the first height. The first height may be dimensioned to generally correspond to a vertical height of the cutting plate.

In embodiments, the collecting tray includes a base and an outer wall depending from the base. The outer wall may have at least one fold line upon which the outer wall folds to assume the first stored condition. The at least one fold line may be is dimensioned to extend along a major portion of the perimeter of the outer wall of the collecting tray. The outer wall of the collecting tray may define a plurality of fold lines. In one embodiment, the outer wall defines a first wall segment adjacent the base, a second wall segment extending from the first wall segment and being separated therefrom by a first fold line, and a third wall segment extending from the second wall segment and being separated therefrom by a second fold line, whereby, upon movement of the collecting tray to the first stored condition, the first wall segment folds along the first fold line to be at least partially received within a boundary of the second wall segment and the second wall segment folds along the second fold line to be at least partially received within a boundary defined by the third wall segment.

The outer wall of the collapsible tray may comprise a relatively soft elastomeric material.

The cutting plate may include a peripheral edge having a grooved segment and the collecting tray may include a mounting tab. The mounting tab is dimensioned to be received within the grooved segment in secured relation therewith to releasably secure the collecting tray to the cutting plate. The collecting tray may include a plurality of mounting tabs with adjacent mounting tabs being in spaced relation.

In embodiments, the cutting tray includes a first cutting surface and a second opposed cutting surface. The first cutting surface has an outer fluid capturing groove arranged for collecting fluids and directing the fluids toward the collecting tray. The second cutting surface includes outer legs which taper to define a height on one end greater than a height at a second end to thereby position the cutting plate at an angle when the second cutting surface is positioned toward a support surface with the first cutting surface facing upwardly to assist in drainage of fluids toward the collecting tray. The first cutting surface may include an auxiliary fluid capturing groove disposed within an interior section of the first cutting surface for collecting fluids and directing the fluids toward the collecting tray.

BRIEF DESCRIPTION OF THE PREFERRED EMBODIMENTS

The accompanying drawings, which are incorporated in and constitute a part of this specification, illustrate embodiments of the present disclosure and, together with the detailed description of the embodiments given below, serve to explain the principles of the disclosure.

DETAILED DESCRIPTION OF THE PREFERRED EMBODIMENTS

The accompanying drawings, which are incorporated in and constitute a part of this specification, illustrate embodiments of the present disclosure and, together with the detailed description of the embodiments given below, serve to explain the principles of the disclosure.

The cutting board apparatus of the present disclosure includes a cutting plate or member and a food particle catch or tray for accumulating vegetable and meat scraps, freshly diced food products, or juices from carved meats and the like.

Figure 1:
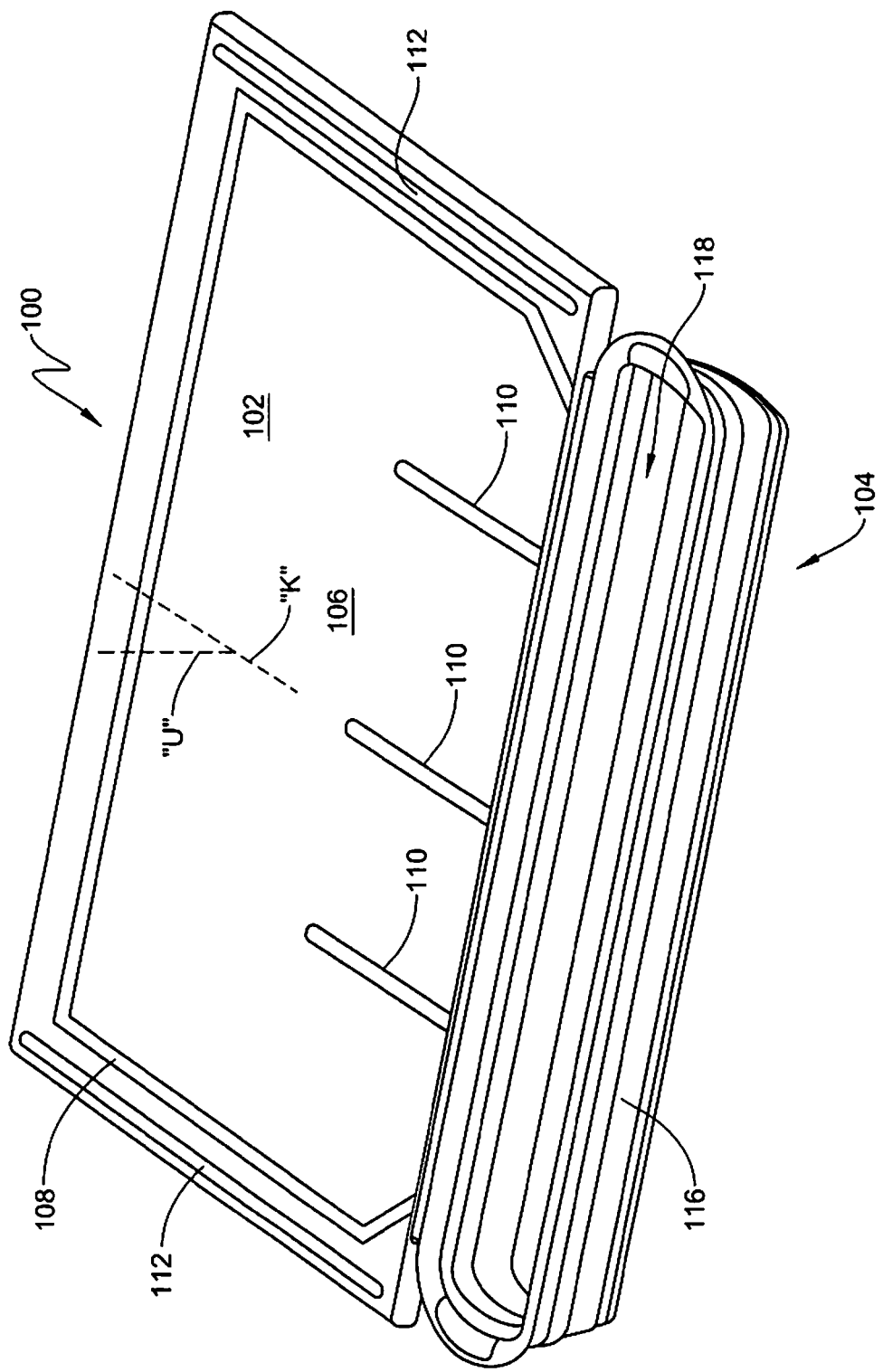
FIGS. 1-2 are perspective views of the apparatus for treating food substances in accordance with the principles of the present disclosure illustrating the cutting plate and collecting tray in an assembled condition.
Figure 2:
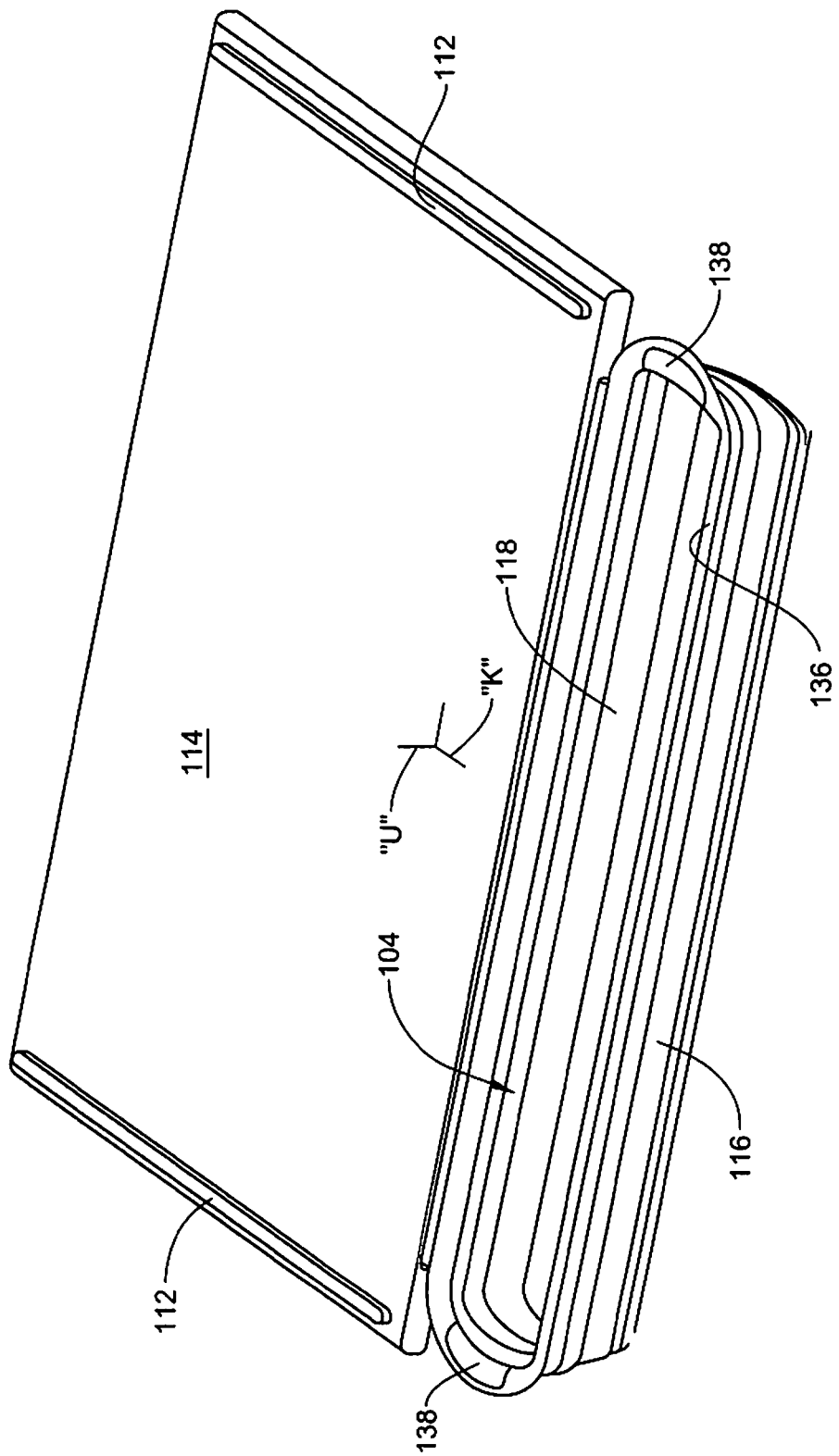

With initial reference to FIGS. 1-2, the cutting board apparatus of the present disclosure is illustrated. Cutting board apparatus 100 includes cutting plate or board 102 defining longitudinal axis "k" and vertical axis "v", and particle collecting tray 104 which is releasably mounted to the plate 102. Cutting plate 102 may be similar to the cutting board disclosed in U.S. Pat. No. 8,251,357 to Young, the entire contents of which are incorporated by reference herein. Cutting plate 102 includes first cutting surface 106 which may be particularly adapted for cutting meats or other food substances capable of producing a liquid or fluid when severed or cut. First cutting surface 106 may be substantially planar and may include a small, e.g., fluid capturing recess or routing 108 (e.g., ⅛ inch in width) around at least a section of the perimeter. Fluid capturing recess or routing 108 may be disposed adjacent three edges of the perimeter of cutting plate 102 to encapsulate and capture the released fluid and direct the fluid to collecting tray 104 thereby preventing seepage of the fluid beyond the perimeter of the cutting plate 102. Additional centrally or internally located fluid capturing recesses 110 may be provided to capture fluids adjacent the center area of first cutting surface 106 and direct the captured fluids into collecting tray 104. The opposed side or cutting surface 114 may be substantially planar. Second cutting surface 114 may be adapted to support vegetables or other non-fluid producing items and provides a greater working surface than first cutting surface due to the absence of any fluid capturing recesses.

Figure 3:
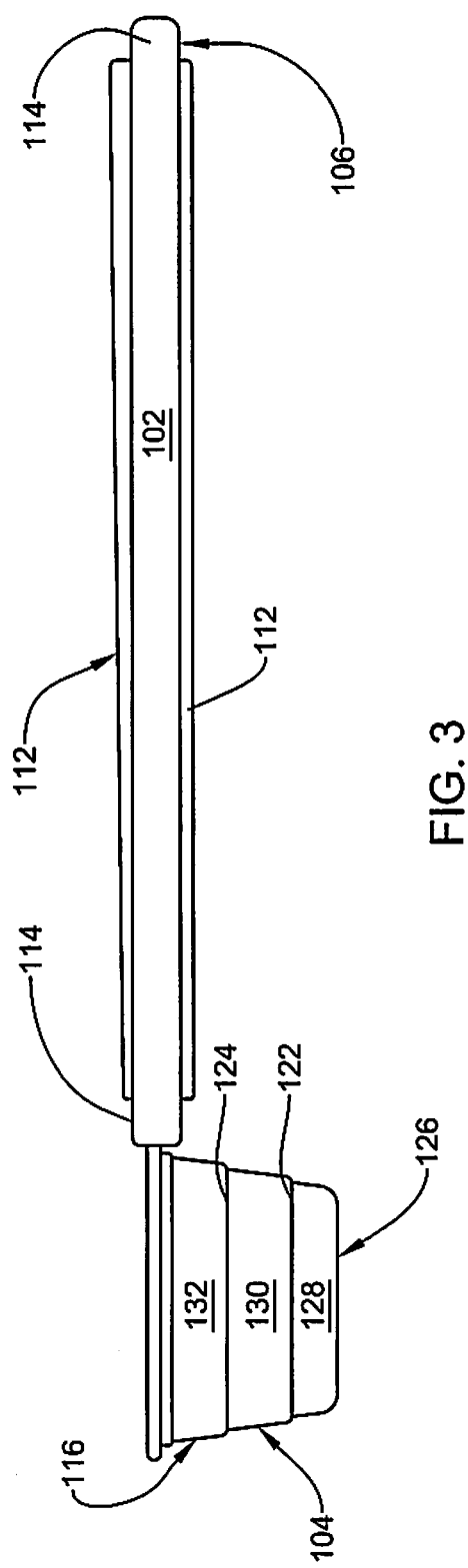
FIG. 3 is a side plan view of the apparatus of FIG. 1.

As best depicted in FIGS. 2-3, at least two inclined legs 112 may be positioned to extend along the longitudinal axis "k" on at least second surface side 114 of cutting plate 102 to orient first cutting surface 106 at a predefined angle relative to the support surface upon which the cutting apparatus is positioned. Inclined legs 112 define a height adjacent the rear end of cutting plate 102 which is greater than the height adjacent the front end near collecting tray 104. Inclined legs 112 may be formed of a friction enhancing material such as rubber and may be insert molded into corresponding openings in the cutting plate 102. This angular relationship will further facilitate drainage of the fluids toward collecting tray 104. Thus, the aforementioned features minimize the potential of the fluids migrating beyond cutting plate 102 and seeping along the support surface, down the front of cabinets or onto the floor etc, and will assist in directing the fluids to collecting tray for subsequent use as a gravy for sliced meat, or for depositing in a pot to be used as an au jus or gravy thickener. The legs 114 are elongated and provide adequate support to cutting plate 102 to prevent tilting or the like. The legs 112 may extend through to the first cutting side 106 and are preferably arranged such that the outer contacting surface of the legs 112 on the first cutting side 106 are parallel to the axis of the cutting plate 102. This will position the second side 114 in general parallel relation with the support surface, i.e., with no inclination of the second cutting surface 114, when the first cutting side is positioned facing the support surface.

Figure 4:
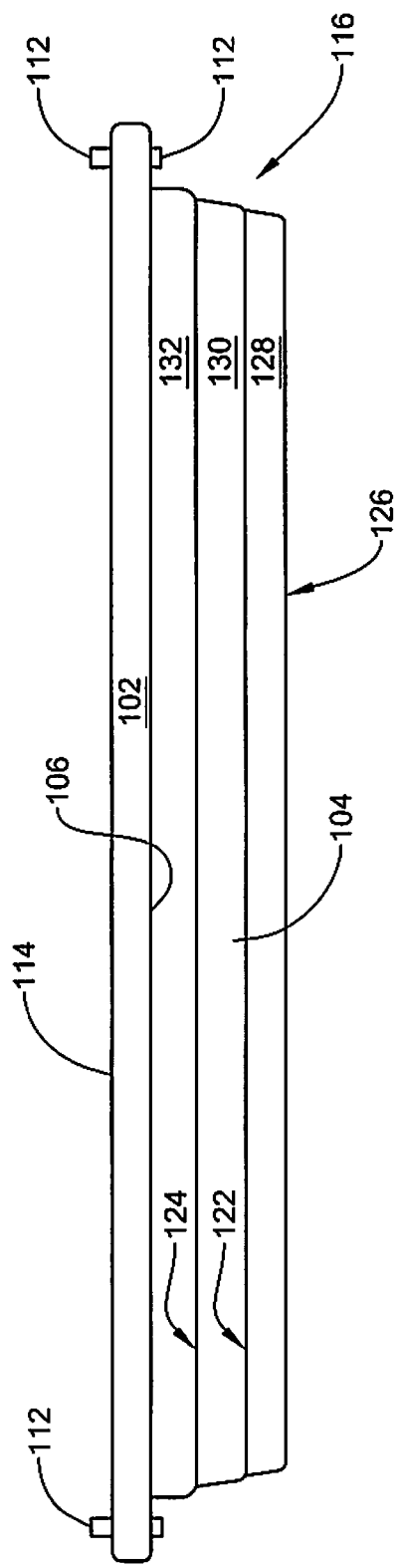
FIG. 4 is a rear plan view of the apparatus of FIG. 1.
Figure 5:
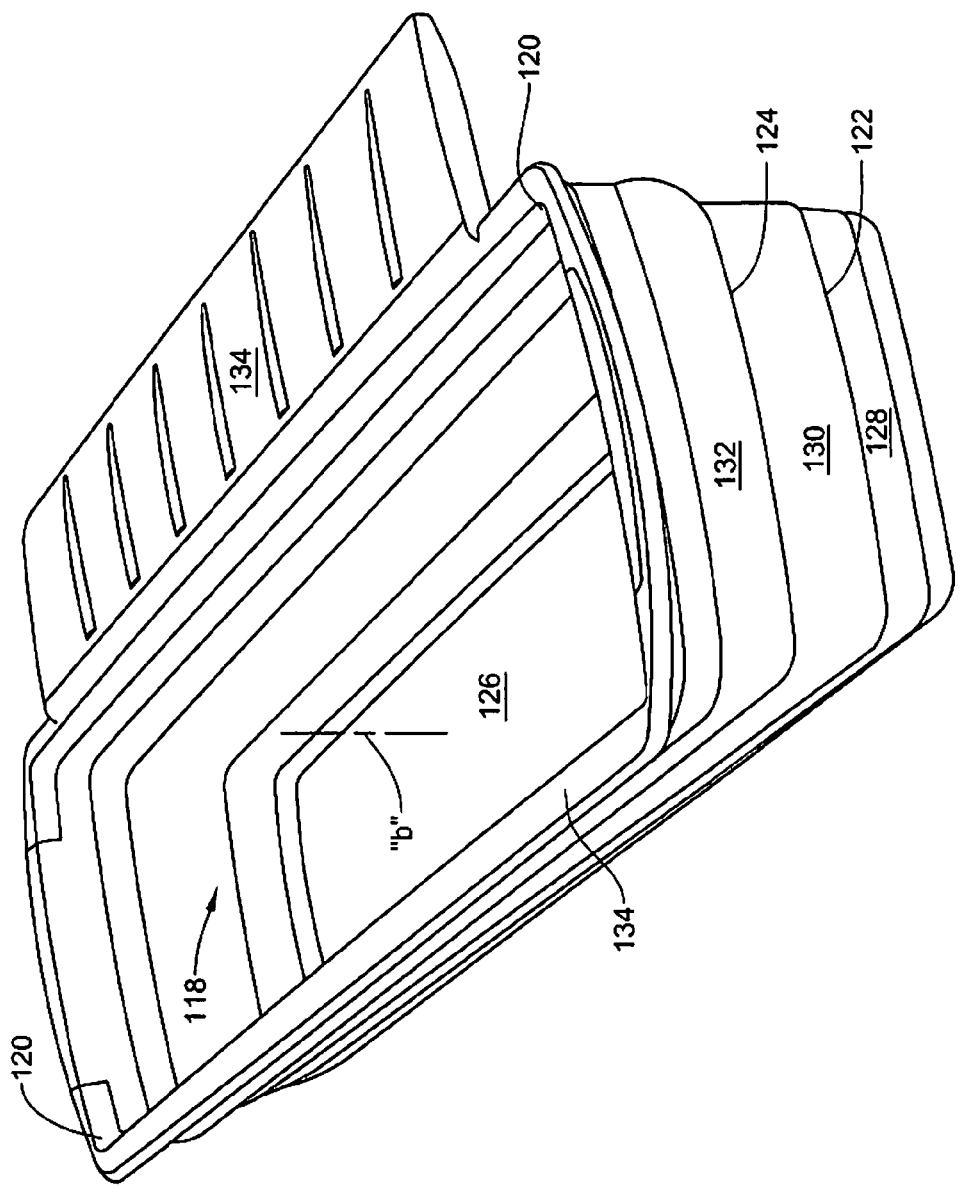
FIG. 5 is a perspective view of the collecting tray of the apparatus of FIG. 1.

Referring now to FIGS. 4-5, in conjunction with FIGS. 1-2, collecting tray 104 will be discussed. Collecting tray 104 is generally elongated in shape and has outer wall or boundary 116 defining internal chamber 118 for collection of fluids, gravy, juices, etc. produced during cutting. Collecting tray 104 may have a variety of dimensions including, but, not limited, to those outlined herein. Collecting tray 104 may define at least one spout 120 adjacent one end of the collecting tray 104, e.g., at the intersection of the walls of the collecting tray 104 in, e.g., the form of an arcuate recess. Spout 120 is dimensioned to pour the captured fluid into, e.g., a pot or cup. First and second spouts 120 may be provided on respective opposed ends of collecting tray 104. Collecting tray 104 may extend the transverse length of the cutting plate 102, or may be longer in length. Collecting tray defines vertical axis "b" corresponding to the height of the collecting tray 104.

The collecting tray 104 is collapsible being adapted to transition between an open operative condition during use and a closed condition for storage. In one embodiment, the collapsible tray 104 has one or more peripheral hinge or fold lines extending around at least a portion of, or the entire perimeter, of the outer wall 116 of the tray 104. In one embodiment, the outer wall 116 includes first fold line 122 and second fold line 124. First fold line 122 is adjacent base 126 of collecting tray 104 and second fold line 124 is adjacent the top of the collecting tray. First, second and third wall segments 128, 130, 132 are respectively defined between the base 126 and the first and second fold lines 122, 124. As to be discussed in greater detail hereinbelow, upon movement of the collecting tray 102 to the stored condition, the first wall segment 128 folds along the first fold line 122 to be at least partially received within a boundary of the second wall segment 130 and the second wall segment 130 folds along the second fold line 124 to be at least partially received within a boundary defined by the third wall segment 132. In general, the outer wall 116 folds or collapses within itself, with the lower segment moving, e.g., upwardly toward the upper segment with each section defined within the fold lines folding upon themselves. More fold lines and corresponding wall segments are also envisioned.

Collecting tray 104 may be formed of a suitable plastic material, and the fold lines 122, 124 may be formed during manufacture of the tray, e.g., through injection molding techniques. The fold lines 122, 124 within the wall 116 of the tray 104 may also have a cross-section or thickness which is less than the thickness of the remaining part of the wall. This will also facilitate folding of the tray 104 upon or within itself. In embodiments, the wall 116 of the collecting tray 104 is fabricated from an elastomeric or softer material, e.g., silicone, rubber to facilitate folding upon itself. The fold lines 122, 124 may not be defined lines within the outer wall 116 but may be wall segments which are curved or contoured to facilitate folding of the wall segments 122, 130, 132 upon themselves. For example, the fold lines 122, 124 are not limited to delineated lines within outer wall 116 but include surface areas, contours or the like which permit the wall segments 128, 130, 132 to fold upon themselves when base 126 is pushed upwardly toward the upper lip 134 of the collecting tray 104.

In embodiments, and with reference to FIGS. 2 and 5, collecting tray 104, further includes mounting tab or segment 134 depending outwardly from outer wall 116 adjacent the upper area of the collecting tray 104. Mounting tab 134 is dimensioned to be cooperatively received within a mounting groove of cutting plate 102 to releasably mount the collecting tray 104 to the cutting plate 102. Further details of one method for mounting the mounting tab 134 to the cutting plate 102 may be ascertained by reference to the Young '357 previously incorporated by reference. Collecting tray 104 may include a peripheral lip 136 adjacent the upper area of the collecting tray 104. Peripheral lip 136 defines handle segments to facilitate handling of the collecting tray. In embodiments, base 126, monitoring tab 134 and peripheral lip 136 are formed of a rigid polymeric material, i.e., a more rigid material than outer wall 116. These separate components are assembled via, insert molding or with the use of adhesives or the like. The outer wall 116 may define upper handle segments 138 which rest within the upper peripheral lip 136. The handle segments 138 provide an area for the user to grasp (due to its elastomeric characteristic) which minimizes slippage and also may serve a means of connecting the wall with the upper perimeter of the tray or cup.

The collecting tray 104 is preferably mounted relative to cutting plate in a manner where the upper surface of collecting tray is flush or below the operative cutting surface, of cutting plate 102. This will ensure that fluids removed, e.g., by fluid capturing grooves are directed into internal chamber of collecting tray and/or the sliced particles or scrap may be swept into the collecting tray. In addition, collecting tray 104 may be positioned with respect to support surface in a manner where the collecting tray is not supported by the support surface, but is supported by the releasable mounting mechanisms discussed hereinabove.

Figure 6:
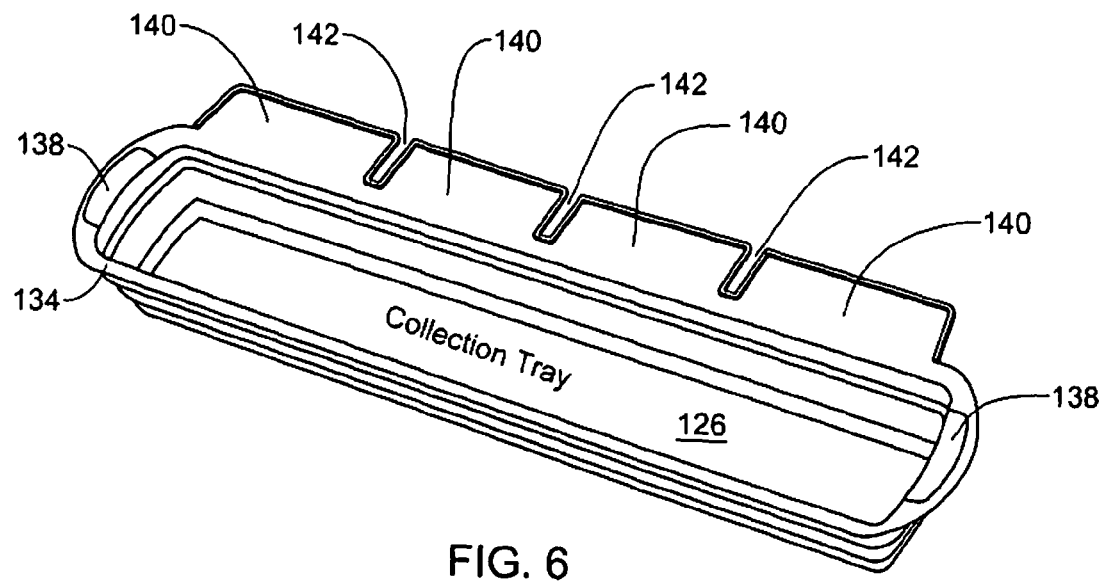
FIG. 6 is a perspective view of an alternate embodiment of the collecting tray of the apparatus of FIG. 1.
Figure 7:
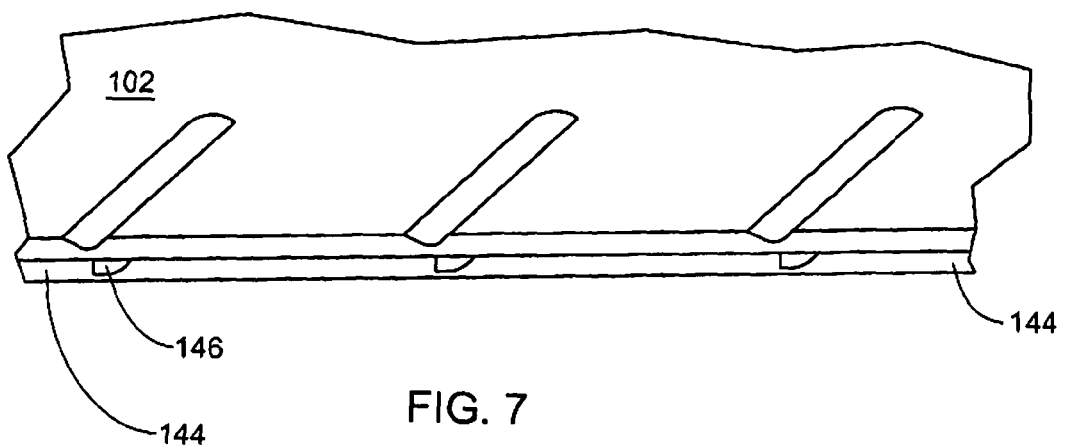
FIG. 7 is a partial perspective view of an embodiment of the cutting plate illustrating a mounting arrangement for mounting the collecting tray of FIG. 6.

FIGS. 6 and 7 illustrate an alternate arrangement for mounting collecting tray 104 to cutting plate 102. In this embodiment, collecting tray 102 includes a plurality of mounting tabs 140 depending outwardly from outer wall 116 adjacent the upper area of the collecting tray 104. The mounting tabs 140 are arranged in spaced relation, with gaps 142 between adjacent tabs 140, and are dimensioned to be cooperatively received within mounting grooves 144 of cutting plate to releasably mount the collecting tray 104 to the cutting plate 102. The provision of multiple mounting tabs 140 may permit the tabs 140 to flex independently, which assists in positioning of the tabs 140 within the mounting grooves 144. The spacing or gaps 142 between the tabs 140 receives the bridge or alignment elements 146 within the cutting plate 102 to assist in alignment of the tray or cup with the board. In addition, the spacing may be dimensioned such that a supplemental frictional relationship is established with the portions of the mounting segments or tabs defining the spaces 142 and with the bridge elements 146 to further assist in releasably securing the tray or cup relative to the board.

Figure 8:
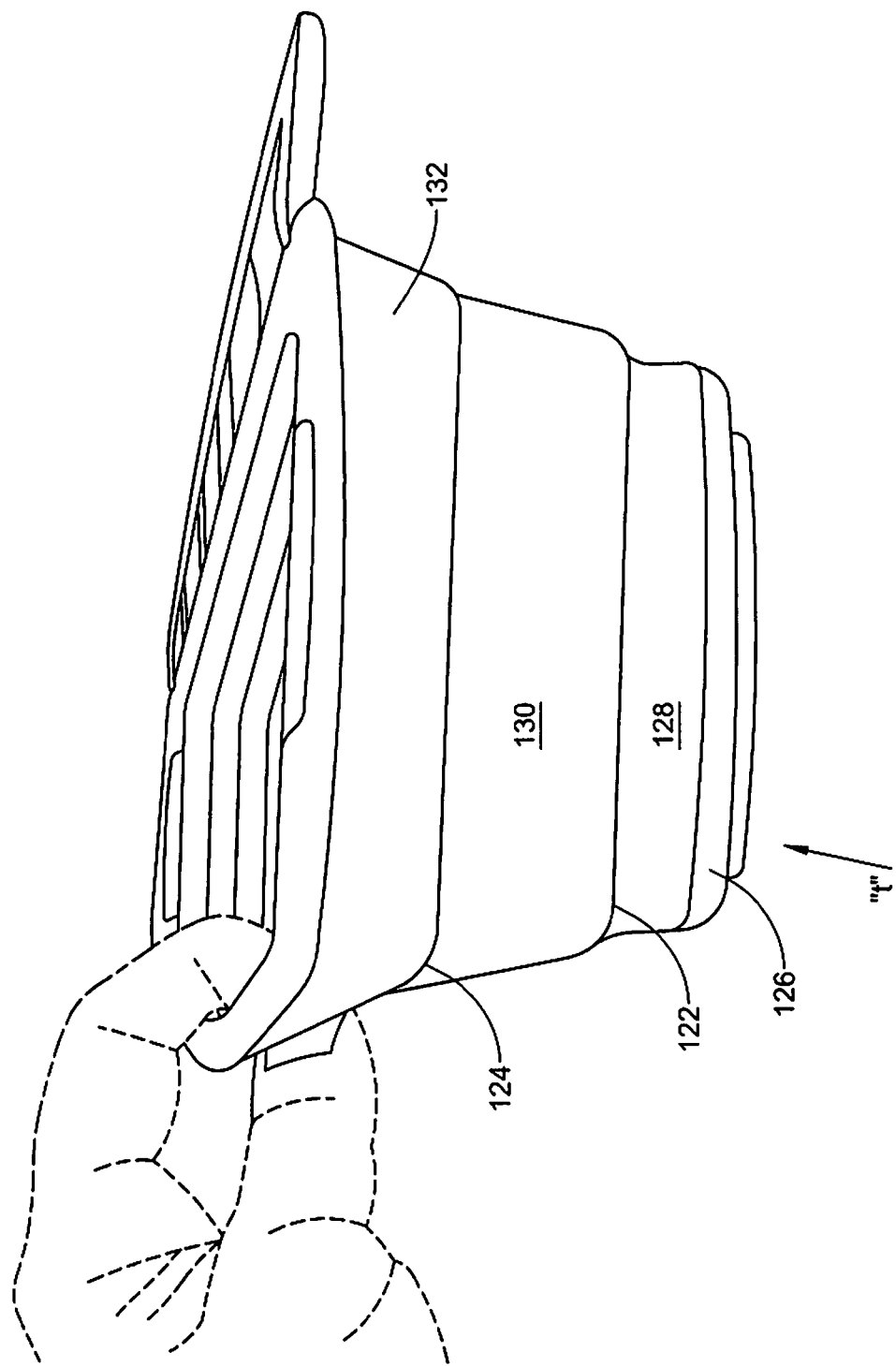
FIGS. 8-10 are views illustrating a sequence of moving the collecting tray from an operative condition to a stored condition.
Figure 9:
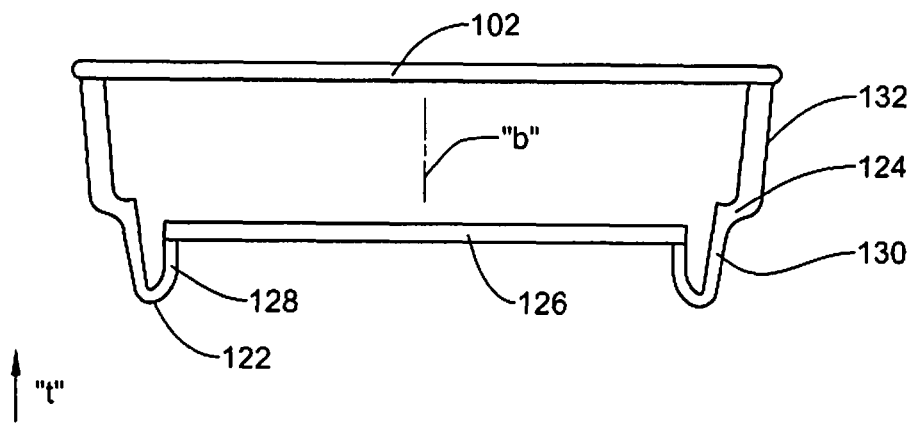
Figure 10:
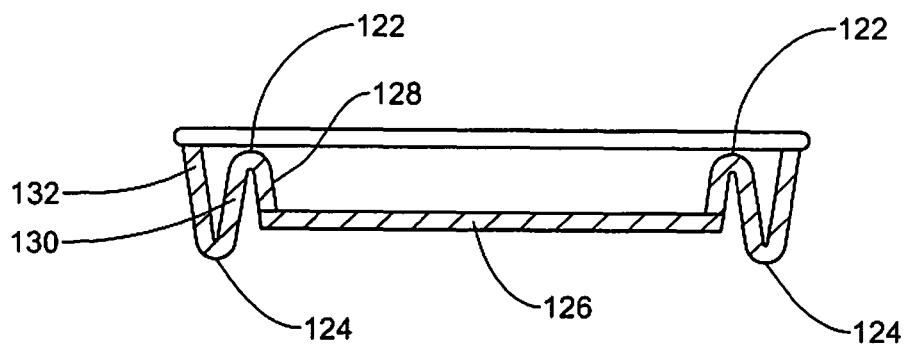
Figure 11:
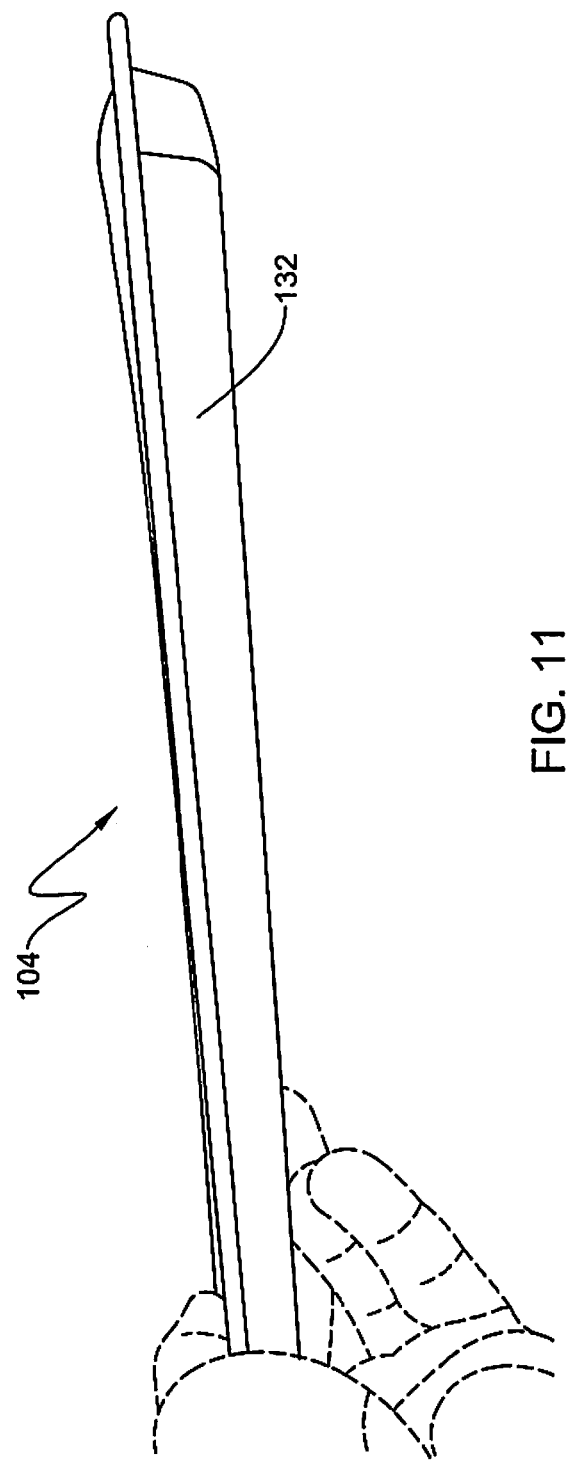
FIG. 11 is a view illustrating the collecting tray in the stored condition.
Figure 12:
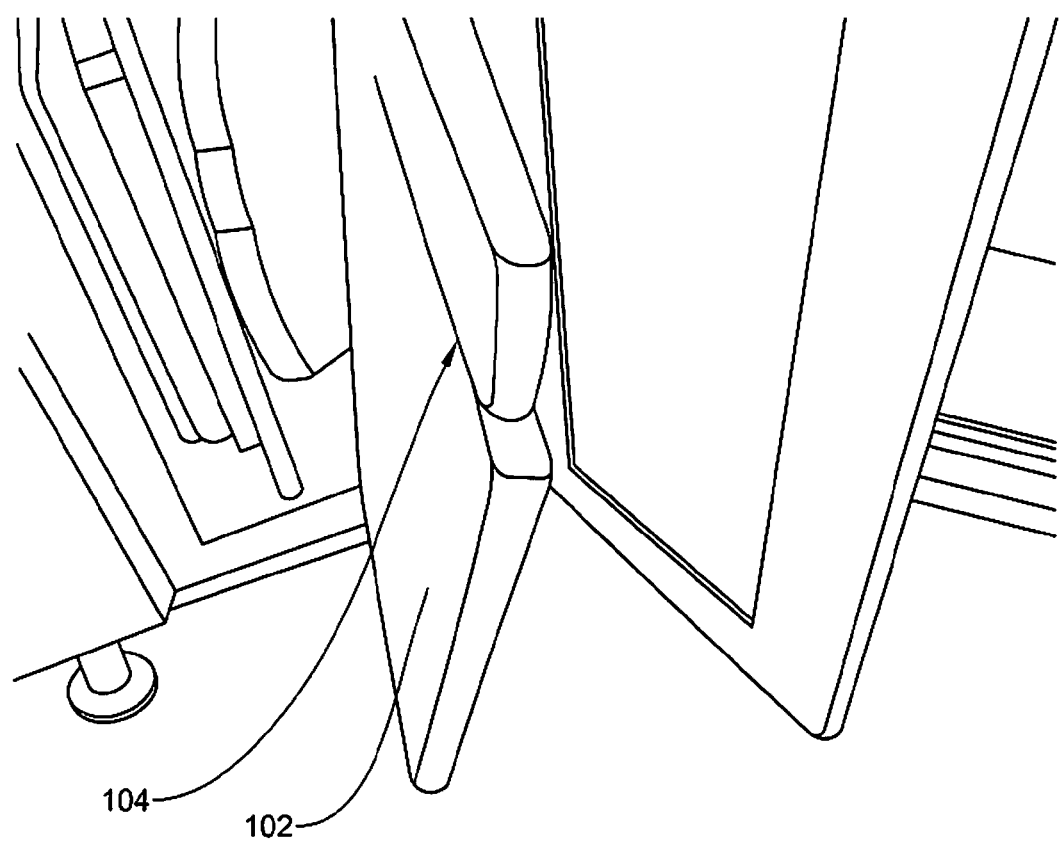
FIG. 12 illustrates the collecting tray in the stored condition mounted to the cutting plate and being positioned within a cabinet.

FIGS. 8-10 illustrate collapsing of the collecting tray 104 from an operative condition to a stored condition. When it is desired to store the collecting tray 104, a force is applied in the direction "t" to base 126 of collecting tray 104. Upon the application of force "t", first wall segment 128 folds inward along fold line 122 to be at least partially confined within the inner boundary of wall segment 130 as depicted in FIG. 9. Continued force in the direction "t" causes second wall segment 130 to fold along fold line 124 to position the second wall segment 130 and the first wall segment 128 in the inner boundary of wall segment 132 as depicted in FIG. 10. In this condition, i.e., the stored condition, the collecting tray 104 presents a reduced profile for storage. FIG. 11 is a perspective view of the collecting tray 102, in the stored condition. In this condition, the vertical height along axis "b" generally corresponds to the thickness of the cutting plate 102. In embodiments, the vertical height may be less than the thickness of the cutting plate or slightly greater than the thickness of the cutting plate 102. This facilitates storage of the apparatus 100 in a cabinet or the like as depicted in FIG. 12. It is noted that the collecting tray 104 may be secured to the cutting plate 102 via any of the mounting mechanisms discussed hereinabove to store the apparatus 100 as a single unit.

It will be understood that various modifications and changes in form and detail may be made to the embodiments of the present disclosure without departing from the spirit and scope of the disclosure. Therefore, the above description should not be construed as limiting the invention but merely as exemplifications of embodiments thereof. Those skilled in the art will envision other modifications within the scope and spirit of the present disclosure as defined by the claims appended hereto.

What is claimed is:

1. An apparatus for treating food substances, which comprises: a cutting plate defining a longitudinal axis and having at least one a first cutting surface and a second opposed cutting surface, the cutting plate being repositionable between a first orientation where the first cutting surface is presented for supporting food substances and a second orientation where the second cutting surface is presented for supporting food substances the cutting plate including an outer peripheral edge having a grooved segment; and a collecting tray mounted with respect to the cutting plate and arranged about a vertical axis corresponding generally to a depth of the collecting tray, the collecting tray being dimensioned and configured to transition between a first stored collapsed condition defining a first depth of the collection tray to facilitate storage or transport thereof and a second operative expanded condition defining a second depth of the collection tray greater than the first depth to provide an internal chamber for collecting food substances cut on the cutting surface, the collecting tray including a mounting tab, the mounting tab received within the grooved segment of the cutting plate in secured relation therewith to releasably secure the collecting tray to the cutting plate in each of the first and second orientations of the cutting plate.

2. The apparatus according to claim 1 wherein the first depth is dimensioned to generally correspond to a vertical height of the cutting plate.

3. The apparatus according to claim 2, wherein the collecting tray includes a base and an outer wall depending from the base, the outer wall having at least one fold line upon which the outer wall folds to assume the first stored condition.

4. The apparatus according to claim 3, wherein the at least one fold line is dimensioned to extend along a major portion of a perimeter of the outer wall of the collecting tray.

5. The apparatus according to claim 4, wherein the outer wall of the collecting tray defines a plurality of fold lines.

6. The apparatus according to claim 5 wherein the outer wall defines a first wall segment adjacent the base, a second wall segment extending from the first wall segment and being separated therefrom by a first fold line, and a third wall segment extending from the second wall segment and being separated therefrom by a second fold line, whereby, upon movement of the collecting tray to the first stored condition, the first wall segment folds along the first fold line to be at least partially received within a boundary of the second wall segment and the second wall segment folds along the second fold line to be at least partially received within a boundary defined by the third wall segment.

7. The apparatus according to claim 4 wherein the outer wall of the collapsible tray comprises a relatively soft elastomeric material.

8. The apparatus according to claim 7 wherein the collecting tray includes a plurality of mounting tabs with adjacent mounting tabs being in spaced relation.

9. The apparatus according to claim 1 wherein the first cutting surface has an outer fluid capturing groove arranged for collecting fluids and directing the fluids toward the collecting tray.

10. The apparatus according to claim 9 wherein the second cutting surface includes outer legs which taper to define a height on one end greater than a height at a second end to thereby position the cutting plate at an angle when the second cutting surface is positioned toward a support surface with the first cutting surface facing upwardly to assist in drainage of fluids toward the collecting tray.

11. The apparatus according to claim 10 wherein the first cutting surface includes an auxiliary fluid capturing groove disposed within an interior section of the first cutting surface for collecting fluids and directing the fluids toward the collecting tray.

12. The apparatus according to claim 8 wherein the peripheral edge includes a plurality of grooved segments dimensioned for receiving respective mounting tabs of the collecting tray.

13. An apparatus for treating food substances, which comprises: a cutting plate defining a longitudinal axis and having a first cutting surface and a second opposed cutting surface, the cutting plate being repositionable between a first orientation where the first cutting surface is presented for supporting food substances and a second orientation where the second cutting surface is presented for supporting food substances; and a collapsible collecting tray mounted with respect to the cutting plate and arranged about a vertical axis corresponding generally to a depth of the collecting tray, the collecting tray being dimensioned and configured to transition between a first collapsed condition defining a first depth of the collecting tray to facilitate storage or transport thereof and a second operative condition defining a second depth of the collecting tray greater than the first height to provide an internal chamber for collecting food substances cut on the cutting surface, the collecting tray being releasably securable to a peripheral segment of the cutting plate in each of the first and second orientations of the cutting plate.

* * * * *